(12) United States Patent
Latteo

(10) Patent No.: US 10,955,115 B2
(45) Date of Patent: Mar. 23, 2021

(54) PROJECTOR OF A LIGHT BEAM

(71) Applicant: D.T.S. ILLUMINAZIONE S.R.L., Misano Adriatico (IT)

(72) Inventor: Eliseo Latteo, San Clemente (IT)

(73) Assignee: D.T.S. ILLUMINAZIONE S.R.L., Misana Adriatico (IT)

( * ) Notice: Subject to any disclaimer, the term of this patent is extended or adjusted under 35 U.S.C. 154(b) by 128 days.

(21) Appl. No.: 16/417,060

(22) Filed: May 20, 2019

(65) Prior Publication Data

US 2019/0360665 A1   Nov. 28, 2019

(30) Foreign Application Priority Data

May 28, 2018   (IT) .......................... 102018000005776

(51) Int. Cl.
*F21V 14/06*      (2006.01)
*F21S 10/00*      (2006.01)
(Continued)

(52) U.S. Cl.
CPC ............. *F21V 14/06* (2013.01); *F21S 10/00* (2013.01); *F21V 5/02* (2013.01); *F21V 5/045* (2013.01);
(Continued)

(58) Field of Classification Search
CPC ........ F21V 14/06; F21V 14/065; F21V 14/08; F21V 14/085; F21V 5/02; F21V 5/045;
(Continued)

(56) References Cited

U.S. PATENT DOCUMENTS

| 4,037,097 | A | * | 7/1977 | Stillman | .................... F21V 9/40 |
| | | | | | 362/324 |
| 2001/0055209 | A1 | * | 12/2001 | Dedoro | ................. F21S 10/007 |
| | | | | | 362/293 |

(Continued)

FOREIGN PATENT DOCUMENTS

| EP | 1167868 A2 | 1/2002 |
| EP | 3056804 A1 | 8/2016 |

(Continued)

OTHER PUBLICATIONS

Italian Search Report dated Sep. 20, 2018 from counterpart IT App No. IT 201800005776.

(Continued)

*Primary Examiner* — Joseph L Williams
*Assistant Examiner* — Jose M Diaz
(74) *Attorney, Agent, or Firm* — Shuttleworth & Ingersoll, PLC; Timothy Klima (57) ABSTRACT

A projector of a light beam includes a first optical body movable along a frame for modifying its position with respect to an outlet lens and to a light source. A second optical body includes a first prismatic lens having a first number of twists and turns on at least one relative concave surface for generating a plurality of optical effects acting on the beam. A third optical body includes a second prismatic lens, positioned alongside the first prismatic lens, having a second number of twists and turns for generating a plurality of optical effects, individually or in combination with the first prismatic lens. The second and third optical bodies can rotate between non-operating positions, wherein the respective prismatic lenses are away from the light beam, and operating positions, wherein the respective prismatic lenses are positioned along a lighting trajectory of the light beam.

9 Claims, 5 Drawing Sheets

(51) Int. Cl.
*F21V 5/02* (2006.01)
*F21V 5/04* (2006.01)
*F21V 13/14* (2006.01)
*F21V 17/02* (2006.01)
*G03B 21/14* (2006.01)
*G03B 21/20* (2006.01)
*F21W 131/406* (2006.01)

(52) U.S. Cl.
CPC .............. *F21V 5/048* (2013.01); *F21V 13/14* (2013.01); *F21V 17/02* (2013.01); *G03B 21/142* (2013.01); *G03B 21/145* (2013.01); *G03B 21/206* (2013.01); *F21W 2131/406* (2013.01)

(58) Field of Classification Search
CPC .......... F21V 5/048; F21V 5/008; F21V 13/14; F21V 17/02; G03B 21/142; G03B 21/145; G03B 21/206; G03B 21/20; G03B 21/2093; G03B 21/14; F21W 2131/406; F21S 10/00; F21S 10/026; F21S 41/63; F21S 41/635; F21S 41/68; F21S 41/683; F21S 41/686; F21S 41/698
See application file for complete search history.

(56) References Cited

U.S. PATENT DOCUMENTS

| | | | |
|---|---|---|---|
| 2003/0076681 A1* | 4/2003 | Rasmussen | F21S 10/007 362/280 |
| 2012/0121244 A1 | 5/2012 | Stavely | |
| 2013/0094219 A1* | 4/2013 | Jurik | F21V 14/00 362/322 |
| 2016/0238217 A1* | 8/2016 | Latteo | F21V 17/02 |
| 2018/0363885 A1* | 12/2018 | Jurik | G05B 19/23 |

FOREIGN PATENT DOCUMENTS

| | | |
|---|---|---|
| WO | 2012138770 A2 | 10/2012 |
| WO | 2015022644 A1 | 2/2015 |

OTHER PUBLICATIONS

European Search Report dated Jun. 4, 2019 from counterpart European App No. 19175170.

* cited by examiner

PROJECTOR OF A LIGHT BEAM

This application claims priority to Italian Patent Application 102018000005776 filed May 28, 2018, the entirety of which is incorporated by reference herein.

BACKGROUND OF THE INVENTION

This invention relates to a projector of a light beam.

More specifically, the projector according to this invention is used for lighting television programs, theatrical performances and outdoor or indoor public shows.

There are various types of projectors on the market structured to be able to emit various types of light beams for the above-mentioned use.

There are projectors which are able to emit directed light beams, beams modified in amplitude, intensity, coloring and combined with optical effects which are capable of varying the shape of the beam emitted.

In order to be able to guarantee these features, the projector comprises a shell for containing and supporting the components which generate the light beam. The shell has a main longitudinal extension along a relative axis of longitudinal extension.

The shell is, normally, articulated to a support (usually configured in the form of a fork) to be able to rotate about at least a first axis transversal to the its longitudinal axis of extension, whilst the support is configured to be able to rotate about a second axis perpendicular to the axis of longitudinal extension to allow a series of coordinated positions designed to conveniently direct the light beam as a function of the needs of illumination.

It should be noted that the components of the projector generating the light beam are positioned inside the shell and comprise, at least, in the basic prior art solutions:
a frame for connecting the two ends of the containment shell;
a light source located at a first end of the shell and connected to a source of energy for emitting the light beam along a direction of illumination parallel to the axis of longitudinal extension of the shell;
an outlet lens of the light beam positioned at a second end of the containment shell and affects the passage of the light beam;
a first optical body for varying the focal length (or zoom) of the light beam supported by the frame and interposed between the first optical body and the outlet lens; the first optical body comprises means for moving, in two directions, along the wall of the frame for modifying its position relative to the outlet lens (on one side) and the first optical body (on the other side) along a trajectory parallel to the longitudinal axis of the containment shell.

One or more optical bodies may be added to this base structure configured for modifying the type of color or the shape of the light beam at the outlet from the projector as a function of the operating requirements for the projector.

The additional optical body(ies) can be inserted inside the shell in various ways.

The additional optical bodies are associated, that is articulated, to respective supporting arms; each supporting arm can rotate, selectively, between a non-operating position, wherein the corresponding additional optical body is moved away from the first optical body and, therefore, from the light beam, and an operating position close to the first optical body wherein the corresponding additional optical body is positioned along the trajectory of the light beam.

In a first solution, the supporting arm of the additional optical body is directly articulated to the frame of the projector in a stable position along the extension of the projector.

In another embodiment, the arm is articulated to the first optical body and is always interposed, in its operating configuration, between the first optical body and the outlet lens.

According to further solutions, the additional optical bodies can be interposed, in their operating configuration, between the first optical body or between a further additional body and the outlet lens of the light beam.

However, these different solutions involve drawbacks to the operating capacity of the projector.

In order to obtain greater visual effects it is necessary to increase the number of additional optical bodies with corresponding supporting structures with a consequent increase both in cost and the number of control devices.

Moreover, a single additional optical body fixed to the frame determines an optical effect which cannot be modified, that is, the outlet angle of the figure obtained is fixed and cannot be modified even by modifying the position of the first optical body.

According to the other solutions, that is to say, with direct connection between the first optical body with an additional optical body, the latter again positioned at a fixed distance (center distance) relative to the optical body to which it is integral and again either downstream or upstream of it relative to the directions of emission of the light beam.

The fixed center distance between additional optical body and (again) the first optical body does not allow modification/expansion of the effect which can be obtained from the additional optical body which there would be adjusting the center distance or modifying the pre-eminence position (relative to the direction of emission of the light beam) between the various optical bodies.

In other words, in order to obtain a multiplicity of visual effects at the outlet from the projector it is currently necessary to have a large series of interchangeable optical bodies which determines a high constructional complexity of the projector or, alternatively, a series of different projectors for different operating requirements.

SUMMARY OF THE INVENTION

The aim of this invention is to provide a projector of light beams which overcomes the above-mentioned drawbacks of the prior art.

More specifically, the aim of this invention is to provide a projector of light beams which is able to widen the range of optical effects of the projector in a safe and precise manner.

A further aim of this invention is to provide a projector of light beams which is able to expand its operational functionalities, while maintaining a limited number of components, a constructional simplicity and reduced dimensions of the projector.

Said aims are fully achieved by the projector of light beams according to the invention as characterized in the appended claims.

BRIEF DESCRIPTION OF THE DRAWINGS

The features of the projector according to the invention will become more apparent from the following detailed description of a preferred, non-limiting embodiment of it, illustrated by way of example in the accompanying drawings, in which.

DESCRIPTION OF THE PREFERRED EMBODIMENTS

Figure 1:
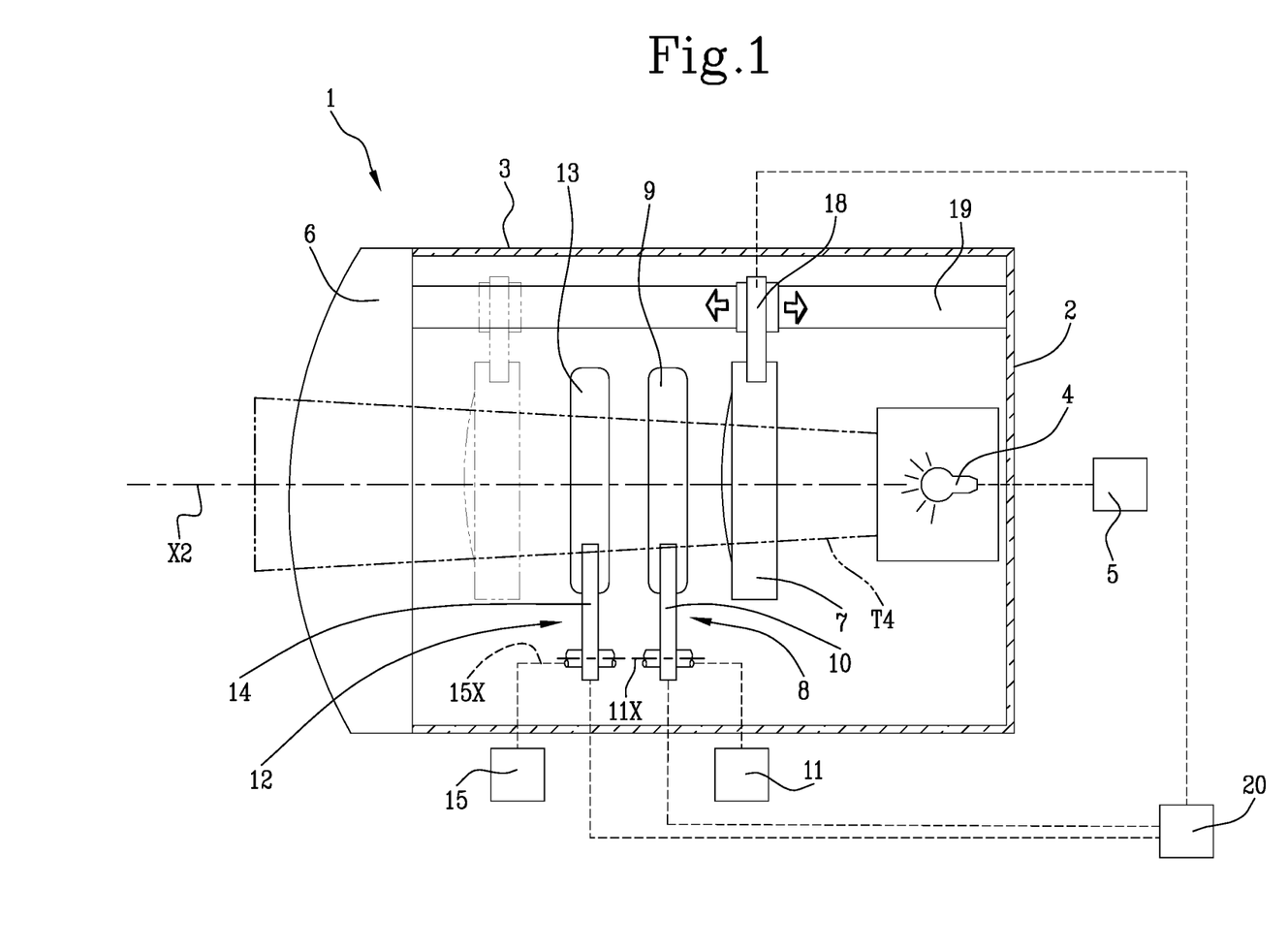
FIG. 1 is a schematic top plan view of a projector of a light beam, according to the invention.

With reference to the accompanying drawings, with particular reference to FIG. 1, the numeral 1 denotes a projector of light beams according to the invention.

More specifically, but without restricting the scope of the invention, the projector 1 according to the invention is used professionally for lighting television programs and outdoor or indoor public shows.

This type of the projector 1, in effect, is structured to be able to emit a beam of light modified in amplitude, intensity, combined with optical effects capable of varying the shape of the beam emitted.

As illustrated, the projector 1 of a light beam comprises a shell 2 having a first end and a second end joined by a central frame 3 to define an axis X2 of extension of the shell 2.

The projector 1 also comprises a light source 4 positioned at the first end of the shell 2 and connected to a source of energy 5 (shown here by a block) for emitting a light beam along a trajectory T4 or optical axis of illumination parallel to the axis X2 of extension of the shell 2.

The projector 1 comprises an outlet lens 6 of the light beam positioned at the second end of the shell 2.

Moreover, the projector comprises a first optical body 7 or zoom for varying the focal length of the light beam, interposed between the light source 4 and the outlet lens 6 and connected internally to the frame 3.

The first optical body 7 is configured to move, in both directions, along the frame 3 for modifying its position relative to the outlet lens 6 and to the light source 4 along a trajectory parallel to the axis X2 of the shell 2. Again as illustrated, the projector 1 comprises inside the frame 3 a second optical body 8 comprising a first prismatic lens 9 having a first number of twists and turns on at least one relative concave surface for generating a plurality of first optical effects acting on the light beam.

Figure 3:
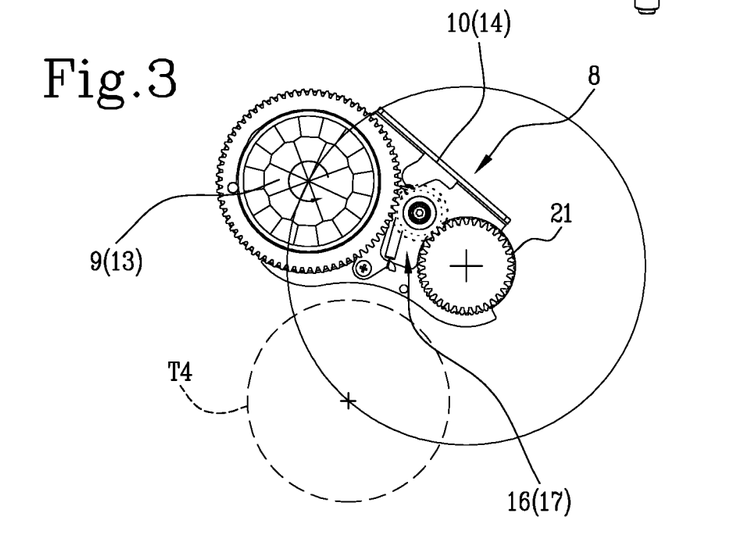
FIG. 3 illustrates a schematic front view of a part of the projector of FIG. 2.
Figure 5:
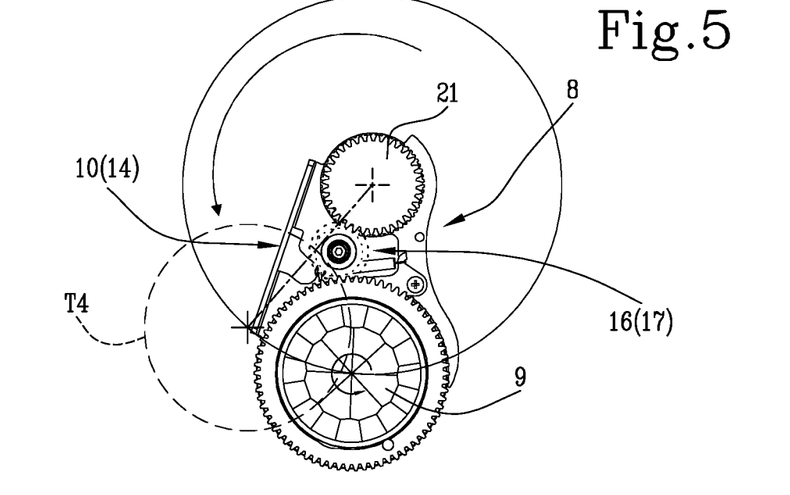
FIG. 5 illustrates a schematic front view of a part of the projector of FIG. 4.
Figure 7:
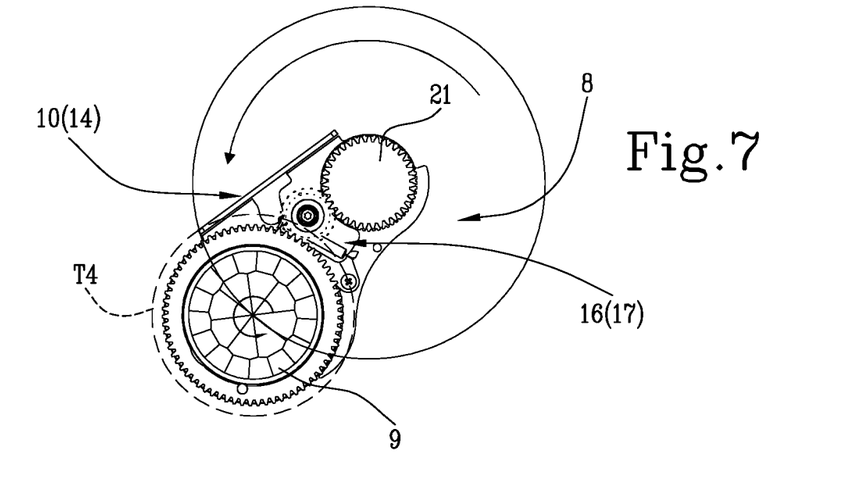
FIG. 7 illustrates a schematic front view of a part of the projector of FIG. 6.

The second optical body 8 (see also FIGS. 3, 5 and 7) has an arm 10 for supporting the first prismatic lens 9 articulated to a movement device 11 connected to the frame 3 and configured to rotate the first prismatic lens 9, between several working positions including at least one position of the first prismatic lens 9 close but not coaxial with the trajectory T4 or optical axis of illumination of the light beam, and more positions spaced away from the trajectory T4 or optical axis of illumination of the second prismatic lens 9 in such a way as to create first optical effects which are not in focus (FIGS. 3, 5 and 7).

The projector 1 also comprises a third optical body 12 comprising a second prismatic lens 13, positioned alongside the first prismatic lens 9, having a second number of twists and turns on at least one respective surface for generating a plurality of second optical effects, individually or in combination with the first prismatic lens 9, acting on the light beam.

The third optical body 12 has an arm 14 for supporting the second prismatic lens 13 articulated to a movement device 15 connected to the frame 3 and configured to rotate the second prismatic lens 13 between several operating positions including at least a position of the second prismatic lens 13 close to but not coaxial with the trajectory T4 or optical axis of illumination of the light beam, and more positions away from the trajectory T4 or optical axis of illumination of the second prismatic lens 9 in such a way as to create second optical effects which are not in focus.

The projector 1 comprises a control unit 20 in communication with the second 8 and the third 12 optical body and configured for controlling the corresponding devices 11, 15 in such a way as to generate, as required, a plurality of combined optical effects at the outlet maintaining the first 9 or the second lens 13 or in combination of both the lenses in a position again not coaxial, that is to say, not in focus, with the trajectory T4 or optical axis of illumination (see FIGS. 3, 5 and from 7 to 9).

In other words, it has been found that, as a surprising effect, the dynamic position outside the axis of the lens(es), with different twists and turns, of the projector with respect to the light beam allows the creation of optical effects different from those which are generally performed with axial lenses and, therefore, in focus on the optical axis of illumination.

This phenomenon, which until now has been considered to be a positioning error is, on the contrary, able to considerably increase the operating capacity of the projector whilst maintaining a reduced number of manufacturing components.

These effects, which have a high quality, allow the creation of light beams with dynamic shapes and axial positioning, which, normally, it is not possible to obtain.

Figure 8:
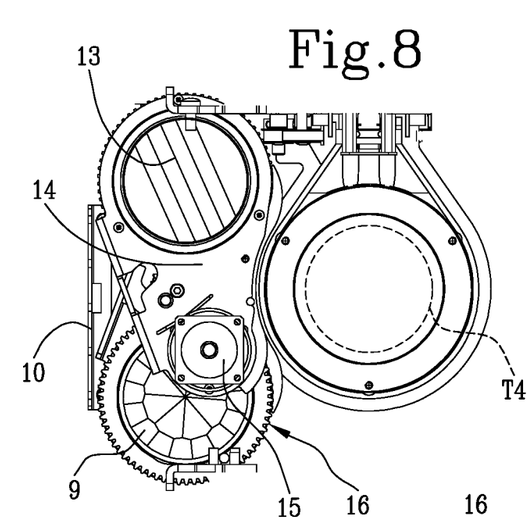
FIGS. 8, 9 and 10 illustrate schematic front views of three different operating configurations of a pair of prismatic lenses of the projector of a light beam of FIG. 1.
Figure 9:
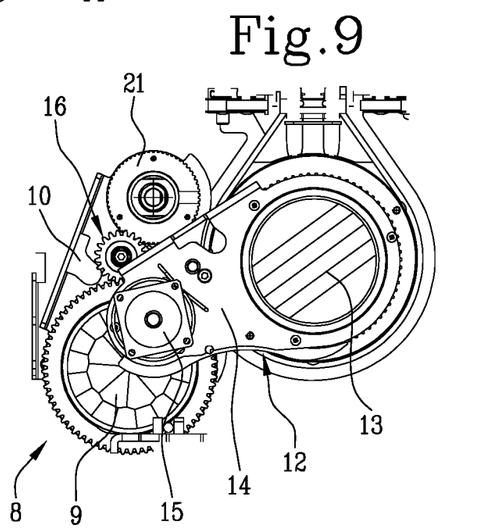
Figure 10:
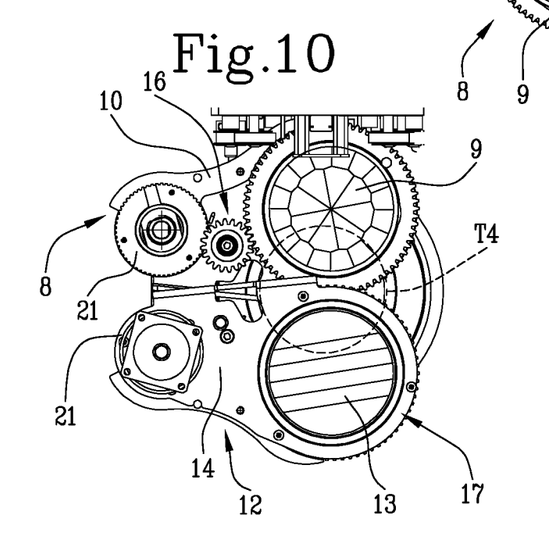

Preferably, the first prismatic lens 9 has a first number of twists and turns greater than the second number of twists and turns present on the second prismatic lens 13 (see also FIGS. 8 to 10).

Figure 2:
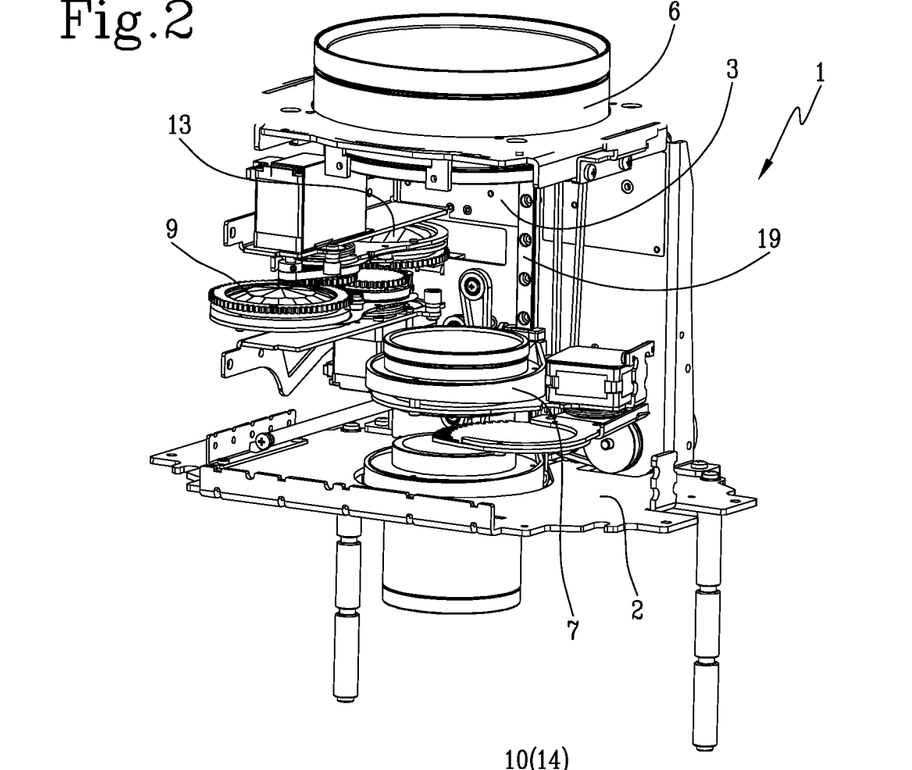
FIG. 2 is a perspective view with some parts cut away to better illustrate others of a first configuration the projector of a light beam of FIG. 1.
Figure 4:
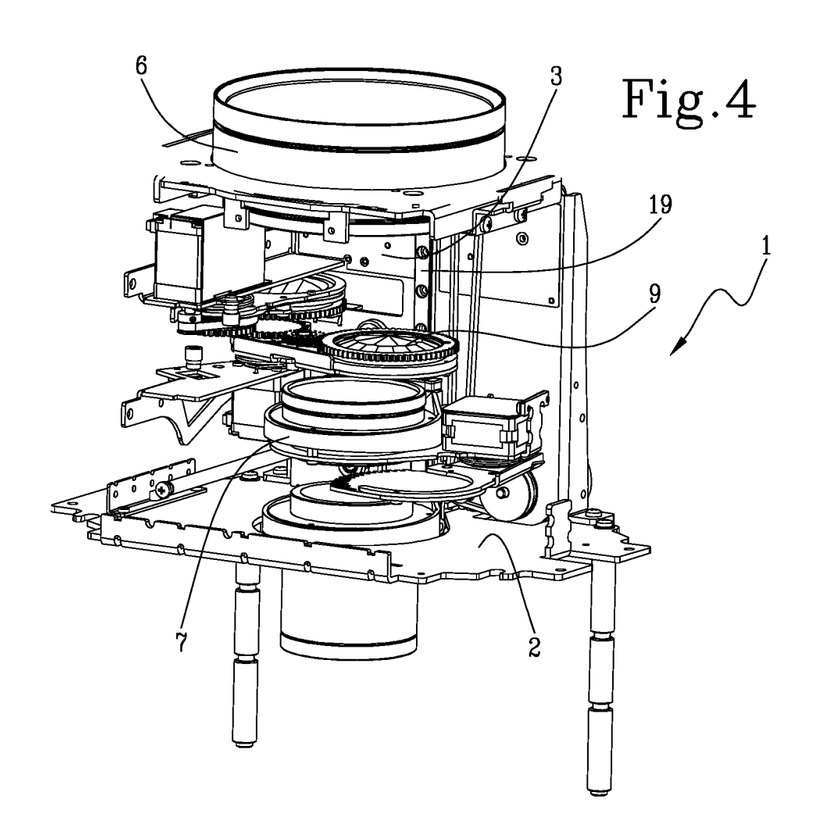
FIG. 4 is a perspective view with some parts cut away to better illustrate others of a second configuration the projector of a light beam of FIG. 1.
Figure 6:
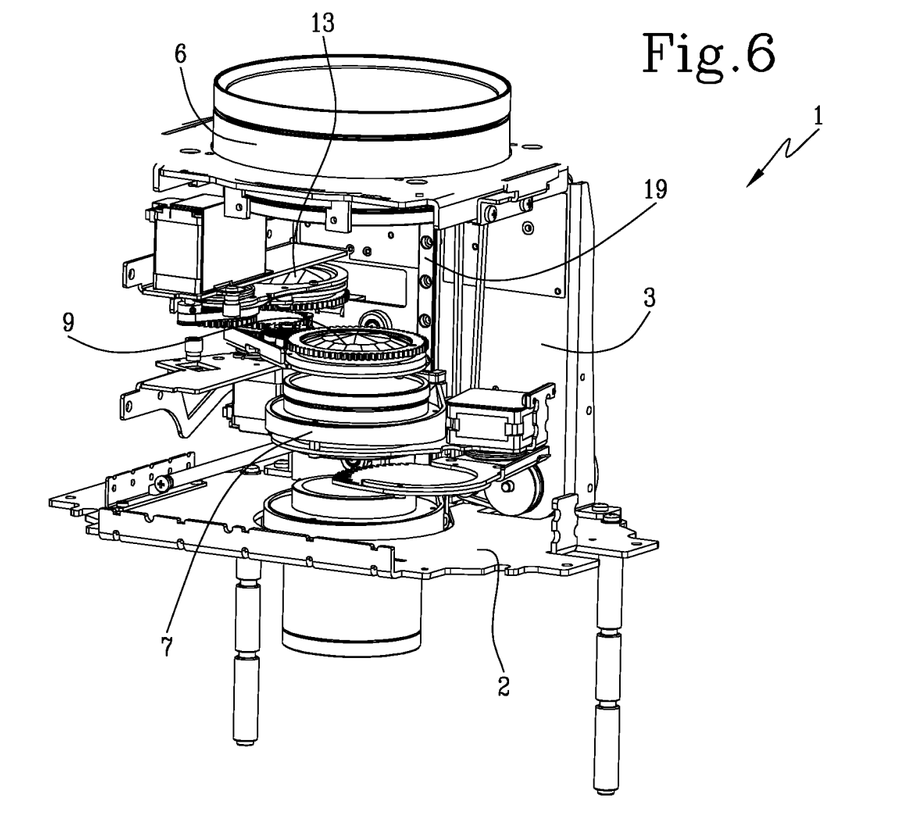
FIG. 6 is a perspective view with some parts cut away to better illustrate others of a third configuration the projector of a light beam of FIG. 1.

According to an alternative embodiment, the first prismatic lens 9 has a first number of twists and turns equal to the second number of twists and turns present on the second prismatic lens 13 (this solution being illustrated in FIGS. 2, 4 and 6).

As mentioned, the device 11 for moving the first prismatic lens 9 is configured to rotate the first prismatic lens 9 between several operational positions including at least one position of the first prismatic lens 9 close to but not coaxial with the trajectory T4 or optical axis of illumination of the light beam, and more positions outside the axis wherein the first prismatic lens 9 is partly outside the lighting trajectory T4 or optical axis (FIG. 5).

Preferably, the device 15 for moving the second prismatic lens 13 is configured to rotate the second prismatic lens 13 between several operating positions including at least one position of the second prismatic lens 13 close to but not coaxial with the trajectory T4 or optical axis of illumination of the light beam, and more positions away from the optical axis wherein the second prismatic lens 9 is partly outside the trajectory T4 or optical axis of illumination (FIG. 10).

In light of this, the devices 11 and 15 for moving the first 9 and the second 13 prismatic lens are programmed to rotate the corresponding first 9 and second 13 prismatic lens in the intermediate operating positions and modify them with a coordinated oscillation between the two prismatic lenses 9, 13 (for example, as illustrated in FIG. 10) in such a way as to allow dynamic optical effects.

It should be noted that the devices 11 and 15 for moving the first 9 and second 13 prismatic lens may cause an oscillation with a continuous pendulum movement or rotate and move the corresponding prismatic lens to a new stable angled position as a function of the type of visual effect programmed.

As mentioned, the movement devices 11 and 15 are in communication with the control unit 20 (illustrated as a block in FIG. 1) which controls the devices according to the required command (through a software program, for example) sent by the operator.

The unit 20 is connected to and also controls the first optical body or zoom 7.

Preferably, the device 11 for moving the first prismatic lens 9 comprises a kinematic element 16 configured for the rotation of the first prismatic lens 9 about its own central axis.

Again preferably, the device 15 for moving the second prismatic lens 13 comprises a kinematic element 17 configured for the rotation of the second prismatic lens 13 about its own central axis.

Each movement device 11 and 15 comprises a motor-driven axis 11X and 15X on which is articulated the corresponding arm 10 and 14 supporting the prismatic lenses 9 and 13.

The kinematic means 16 and 17 of rotation of the two prismatic lenses 9 and 13 comprise a cascade of three gear wheels (of which one motor-driven 21 and keyed to the motor-driven axes) and configured to maintain the rotation of the lenses irrespective of the angular position adopted by the lenses.

Preferably, the first optical body 7 or zoom for varying the focal length of the light beam is connected to a motor-driven carriage 18 for moving the first optical body 7 along the frame 3.

In light of this, the carriage 18 is coupled to a guide 19, extending along the frame 3, in such a way as to allow a plurality of positions of the first optical body 7 along the frame 3 between at least a first position wherein the first optical body 3 is interposed between the light source 4 and the first 9 and second 13 prismatic lens (FIGS. 1, 4 and 6) or between the outlet lens 6 and the first 9 and second 13 prismatic lens.

According to a preferred, non-limiting embodiment, the first prismatic lens 9 can have a series of twists and turns which are able to duplicate the light beam in twenty-four images arranged in groups on concentric circular rings (see FIGS. 2 to 10).

Again according to a preferred, non-limiting embodiment, the second lens 13 has a series of twists and turns which are able to duplicate the light beam in six images arranged in line on one side or the other (see FIGS. 8 to 10).

Therefore, thanks to this structure of the projector, the preset aims are achieved.

In particular, the combination of only two prismatic lenses with equal or different distribution of the duplication faces results in a multiplicity of visual effects which increase thanks also to:
- insertion of a single prismatic lens in any intermediate position between the rest position and the position close to the optical axis;
- simultaneously inserting both prismatic lenses in any intermediate position between the rest position and the position close to the optical axis;
- the position of each prismatic lens can be fixed or can oscillate between two points (one to the left and the other to the right of the optical axis passing through the entire optical axis);
- the movements of two optical bodies supporting the prismatic lenses are independent of each other;
- each prismatic lens may be inserted with the zoom positioned downstream or upstream of the lenses (relative to the direction of the light source);
- each prismatic lens can rotate about its own axis independently and according to the same or different directions.

Thanks to the pair of lenses and the above-mentioned features the specific features of the projector increase considerably compared with respect to the traditional solutions thanks to the out of focus positions, that is to say, not in axial alignment with the optical axis.

The overall size of the projector is reduced also with reference to the quantity of visual effects which can be reproduced with these features.

What is claimed is:

1. A projector of a light beam comprising at least:
   a shell having a first end and a second end joined by a central frame to define an axis of extension of the shell;
   a light source located at the first end of the shell and connected to a source of energy for emitting a light beam along a lighting trajectory or optical axis parallel to the axis of extension of the shell;
   an outlet lens of the light beam positioned at the second end of the shell;
   a first optical body or zoom for varying a focal length of the light beam, interposed between the light source and the outlet lens and connected internally to the frame; the first optical body being configured to move, in both directions, along the frame for modifying a position of the first optical body relative to the outlet lens and to the light source along a trajectory parallel to the axis of the shell;
   a second optical body inside the frame comprising a first prismatic lens having a first number of twists and turns on at least one relative concave surface for generating a plurality of first optical effects acting on the light beam; the second optical body having a first arm for supporting the first prismatic lens articulated to a first movement device connected to the frame and configured for rotating the first prismatic lens,
   a third optical body inside the frame comprising a second prismatic lens, positioned alongside the first prismatic lens, having a second number of twists and turns on at least one respective surface for generating a plurality of second optical effects different from those generated by the first prismatic lens, individually or in combination with the first prismatic lens, acting on the light beam; the third optical body having a second arm for supporting the second prismatic lens articulated to a second movement device connected to the frame and configured to rotate the second prismatic lens between several operating positions including at least a position of the second prismatic lens close to but not coaxial with the trajectory or optical axis of illumination of the light beam, and more positions away from the trajectory or optical axis of illumination of the second prismatic lens in such a way as to create second optical effects which are not in focus;

a control unit in communication with the second and the third optical body and configured for controlling the first and second movement devices in such a way as to generate, as required, a plurality of combined optical effects at the outlet lens maintaining the first or the second prismatic lens or in combination of both the first and second prismatic lenses in a position not coaxial, and not in focus, with the trajectory or optical axis of illumination.

2. The projector according to claim 1, wherein the first number of twists and turns is greater than the second number of twists and turns.

3. The projector according to claim 1, wherein the first number of twists and turns is equal to the second number of twists and turns.

4. The projector according to claim 1, wherein the first and second movement devices are programmed to rotate the corresponding first and second prismatic lens in intermediate operating positions and provide a coordinated oscillation between the first and second prismatic lenses.

5. The projector according to claim 1, wherein the first movement device comprises a first kinematic element configured for rotation of the first prismatic lens about a central axis of the first primatic lens.

6. The projector according to claim 1, wherein the second movement device comprises a second kinematic element configured for rotation of the second prismatic lens about a central axis of the second prismatic lens.

7. The projector according to claim 1, wherein the first optical body or zoom for varying the focal length of the light beam is connected to a motor-driven carriage for moving the first optical body or zoom along the frame; the carriage being coupled to a guide, extending along the frame, in such a way as to allow a plurality of positions of the first optical body along the frame between at least a first position wherein the first optical body is interposed between the light source and the first and second prismatic lens and a second position wherein the first optical body is interposed between the outlet lens and the first and second prismatic lens.

8. The projector according to claim 1, wherein the first number of twists and turns duplicate the light beam in twenty-four images arranged in groups on concentric circular rings.

9. The projector according to claim 1, wherein the second number of twists and turns duplicate the light beam in six images arranged in line on one side or the other.

* * * * *